US006647244B1

United States Patent
Haymond et al.

(10) Patent No.: US 6,647,244 B1
(45) Date of Patent: Nov. 11, 2003

(54) WIRELESS VEHICULAR REPEATER SYSTEM

(75) Inventors: William Dean Haymond, Surrey (CA); Daniel Wayne Ericson, Hollis, NH (US)

(73) Assignee: The Whitaker Corporation, Wilmington, DE (US)

(*) Notice: Subject to any disclaimer, the term of this patent is extended or adjusted under 35 U.S.C. 154(b) by 0 days.

(21) Appl. No.: 09/440,911

(22) Filed: Nov. 16, 1999

(51) Int. Cl.[7] .................................................. H04B 7/15
(52) U.S. Cl. ........................ 455/11.1; 455/16; 455/517; 455/15; 455/422
(58) Field of Search .............................. 455/11.1, 8, 22, 455/527, 404, 10, 7, 18, 121, 15, 517, 572, 9, 13, 14, 53–57, 33–34, 512, 518, 524–525, 509, 515, 54.1, 58.1, 33.1, 34.1, 67.1, 56.1, 817–818; 370/337, 347, 445, 461, 327, 341

(56) References Cited

U.S. PATENT DOCUMENTS

| | | | | |
|---|---|---|---|---|
| 3,745,462 A | * | 7/1973 | Trimble | 455/11.1 |
| 4,234,959 A | * | 11/1980 | Andrea et al. | 455/11.1 |
| 4,659,878 A | * | 4/1987 | Dinkins | 455/11.1 |
| 4,748,685 A | * | 5/1988 | Rozanski, Jr. | 375/217 |
| 4,876,710 A | * | 10/1989 | Reed et al. | 455/404 |
| 5,023,930 A | * | 6/1991 | Leslie | 455/10 |
| 5,109,526 A | * | 4/1992 | Reed | 455/11.1 |
| 5,133,080 A | * | 7/1992 | Borras | 455/11.1 |
| 5,276,686 A | * | 1/1994 | Ito | 370/330 |
| 5,404,570 A | * | 4/1995 | Charas et al. | 455/22 |
| 5,423,055 A | * | 6/1995 | Diaz et al. | 455/15 |
| 5,603,080 A | * | 2/1997 | Kallander et al. | 455/14 |
| 5,768,683 A | * | 6/1998 | Mulford | 370/315 |
| 5,790,938 A | * | 8/1998 | Talarmo | 455/11.1 |
| 5,857,144 A | * | 1/1999 | Mangum et al. | 455/11.1 |
| 5,907,794 A | * | 5/1999 | Lehmusto et al. | 455/11.1 |
| 5,915,208 A | * | 6/1999 | Collyer | 455/11.1 |
| 5,991,599 A | * | 11/1999 | Uchikawa | 455/11.1 |
| 6,041,226 A | * | 3/2000 | Skoro et al. | 455/405 |
| 6,052,557 A | * | 4/2000 | Kinnunen et al. | 370/337 |
| 6,091,939 A | * | 7/2000 | Banh | 375/261 |
| 6,141,533 A | * | 10/2000 | Wilson et al. | 455/11.1 |
| 6,226,524 B1 | * | 5/2001 | Allen et al. | 455/509 |

FOREIGN PATENT DOCUMENTS

| | | | | |
|---|---|---|---|---|
| EP | 280543 | * | 2/1988 | H04Q/7/04 |
| GB | 2298998 A | * | 9/1996 | H04B/1/38 |
| WO | 9815146 | * | 4/1998 | H04Q/7/30 |

OTHER PUBLICATIONS

G. E. Dodrill, J. F. Atkinson, Using Radio Links and Relays, Published Jan–Feb. 1954, vol. 14, No. 1, pp. 15–17.*
Public Safety Report–Apr. 1999, Communications Solutions for Public Safety Navigating Uncharted Waters: 800 MHz Vehicular Repeater Licensing by William J. Carlin, pp. 63–66, 68.

* cited by examiner

Primary Examiner—Pablo N Tran

(57) ABSTRACT

A wireless communications system has a plurality of base stations 1, a plurality of mobile vehicular repeater units 2, and a plurality of portable units 3. In a public safety network context, each mobile vehicular repeater unit 2 is associated with a portable unit 3, and both are associated with a single user. The object is for the user to be able to access the wireless network for any geographic location. In cases where a geographic area is shadowed from a base station 1 and communication directly between the portable unit 3 and the base station 1 is not possible, it is beneficial to use the mobile vehicular repeater unit 2 as a vehicular repeater to relay communications between the portable unit 3 and the base station 1. When the mobile vehicular repeater unit 2 is operating as a repeater and communicating with the portable units, the frequency plan for transmission and reception is reversed.

18 Claims, 4 Drawing Sheets

WIRELESS VEHICULAR REPEATER SYSTEM

FIELD OF THE INVENTION

The present invention relates to wireless communication systems and more specifically to a system for improved communication between a base station, a plurality of mobile units and a plurality of portable units.

BACKGROUND

Wireless communication systems conventionally comprise a plurality of base stations, a plurality of mobile units, and a plurality of portable units. For purposes of the present disclosure, a "mobile unit" refers to a communication device located within a vehicle and powered by a battery located in the vehicle. Conventionally, a mobile unit is capable of 20 Watt RF transmission power. For purposes of the present disclosure, a "portable unit" refers to a communication device located on a person powered by a smaller portable battery that is typically unitary with the communication device. Conventionally, a portable unit is capable of 3 Watt RF transmission power. Each base station is fixed at a single geographic location and transmits high powered RF energy from an antenna mounted at a significant height above ground level. Similarly, the base station receives RF energy at an antenna mounted at a similar significant height above ground level. Each base station communicates with one or more portable units that are geographically positioned within some radius defined by minimum power level necessary to successfully receive an RF signal transmitted to and from the base station. The base stations typically communicate with a central office over a land based cable network or microwave point to point using a frequency range different from the base station to mobile unit communication. The central office performs most of the switching and routing functions, which allows the multiple base stations to inter-operate as a single wireless system.

Portable units are typically hand held by the wireless system user and operate to communicate with one of the base stations to provide connectivity to the larger wireless system. Ideally, a user with one of the portable units is able to maintain communication anywhere within a defined geographic reach. An important metric of the quality of a wireless communication system is the percentage of coverage available within a given geographic area. One of the practical realities of a wireless system, however, is that natural and artificial topographies create communication "shadows" where communication between a portable unit and a base station will degrade or cease altogether. A mobile unit, however, may still be within the coverage area supported by the base station as a result of its higher powered RF transmission capacity. The size and number of the shadows reduce the percentage of portable coverage within a given geographic area.

One solution to the shadow problem is to erect an additional base station that is able to transmit and receive within the shadowed area. Additional base stations as with any increase in infrastructure, however, significantly increase the cost of the overall system. Often the shadowed area is infrequently used and the amount of use does not warrant the cost and maintenance of an additional base station.

Another solution to the shadow problem is to add a component to the overall wireless system called a mobile vehicular repeater unit. The mobile vehicular repeater unit operates as a movable base station that is permanently mounted in a vehicle driven by a user of a portable unit. The mobile vehicular repeater unit acts as an intermediary between the portable unit and the base station to relay information received from the portable unit to the base station and vice versa. The mobile vehicular repeater unit, in practical effect therefore, becomes a "roaming base station" by receiving communications from the base station and further transmitting those communications to one or more portable units. Prior art mobile vehicular repeater solutions implement communication between the portable and the mobile vehicular repeater unit in what is known in the industry as "talk around mode". In "talk around mode", the mobile unit and the portable unit employ simplex communication in a frequency band that the base station uses to transmit a signal to the portable unit. Advantageously, use of the vehicular repeater permits an increase in portable unit coverage. The coverage, however, is over a simplex channel, which decreases the available bandwidth of communication. It would be desireable to increase the portable unit coverage with duplex communication without increasing costly infrastructure.

The vehicular repeater mobile vehicular repeater unit solution is desirable because the less used shadowed area is illuminated temporarily and only when communication to the shadowed area is needed. The mobile vehicular repeater unit solution is reliable because the mobile vehicular repeater unit is typically positioned closer to the user than the base station and has higher transmission power to the base station and higher gain reception capability than typical portable units. Advantageously, the mobile vehicular repeater unit is less costly than a base station.

One of the disadvantages to the mobile vehicular repeater unit solution previously described is that RF signals transmitted by the mobile vehicular repeater unit to the portable unit can interfere with signals received by the mobile vehicular repeater unit from the base station. In a full or half-duplex wireless communication system, each radio channel consists of two frequencies which are separated by a fixed frequency offset. The Federal Communications Commission ("FCC") has defined the forward channel portion, i.e. base station transmission to the portable unit/mobile unit, as operating at the higher frequency of the pair. The FCC has further defined the reverse channel portion, i.e. base station reception from the portable unit/mobile unit, as operating at the lower frequency of the pair. Given this convention, the mobile vehicular repeater unit is receiving from the base station in the same band as it is transmitting to the portable unit. Disadvantageously, the mobile vehicular repeater unit transmitter can desensitize its own receiver. A solution to the desensitization of the receiver by the transmitter is typically expensive frequency management, frequency separation, and complicated RF design. There is a need, therefore, for a reliable and cost effective solution to the disadvantages of the mobile vehicular repeater unit implementation.

SUMMARY

An object of a communication system according to the teachings of the present invention is to increase the percentage portable coverage while minimizing the amount of infrastructure necessary to provide the increased coverage.

A communication system comprises a base station, a mobile vehicular repeater unit, and a portable unit. The base station transmits to the mobile vehicular repeater unit over an upper frequency channel portion. The mobile vehicular repeater unit transmits to the base station over a lower frequency channel portion. The mobile vehicular repeater unit transmits to the portable unit over the lower frequency channel portion. The portable unit transmits to the mobile vehicular repeater unit over the upper frequency channel portion.

A method for communicating in a communication system, the communication system comprises at least one base station, a primary mobile vehicular repeater unit, a primary portable unit and at least one alternative mobile vehicular repeater unit. The method comprises the steps of the portable following a frequency use plan of transmitting on a lower frequency channel portion and receiving on an upper frequency channel portion. The process further comprises attempting to establish communication between the primary portable unit and any one of the at least one base stations. If the attempt to establish communication between the primary portable unit and any one of the at least one base stations fails, the method modifies the frequency use plan for the primary portable unit by transmitting on the upper frequency channel portion and receiving on the lower frequency channel portion. The method then comprises the steps of attempting to establish communication between the primary portable unit and any one of the at least one alternative mobile vehicular repeater units. If the attempt to establish communication between the primary portable unit and any one of the at least one alternative mobile vehicular repeater units fails, the method establishes communication between the primary portable unit and the primary mobile vehicular repeater unit and between the primary mobile vehicular repeater unit and any one of the base stations.

DETAILED DESCRIPTION

Figure 1:
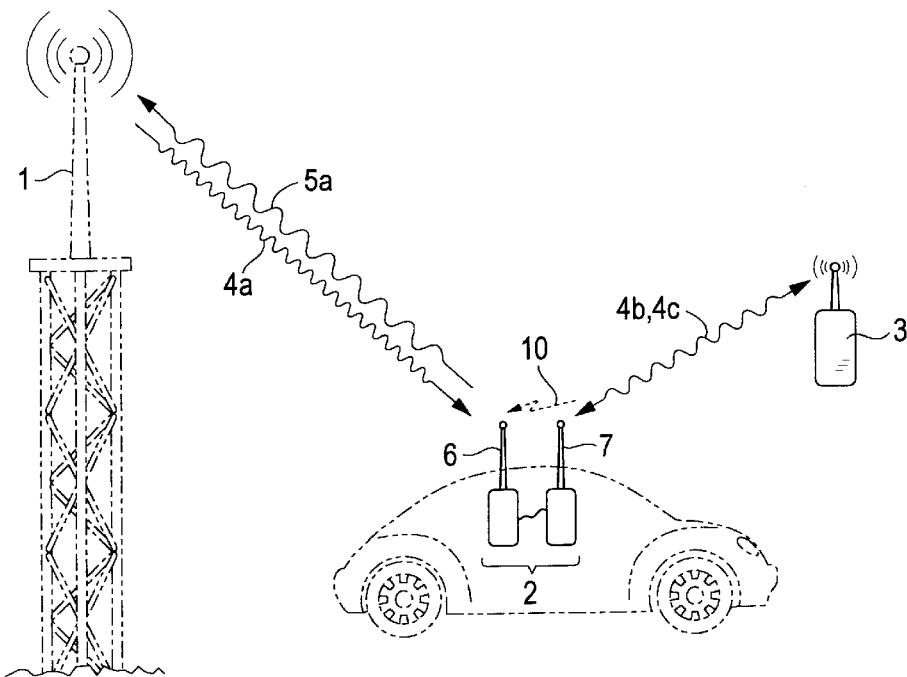
FIG. 1 is an illustrative diagram of a prior art mobile vehicular repeater unit vehicular repeater and associated frequency plan.
Figure 2:
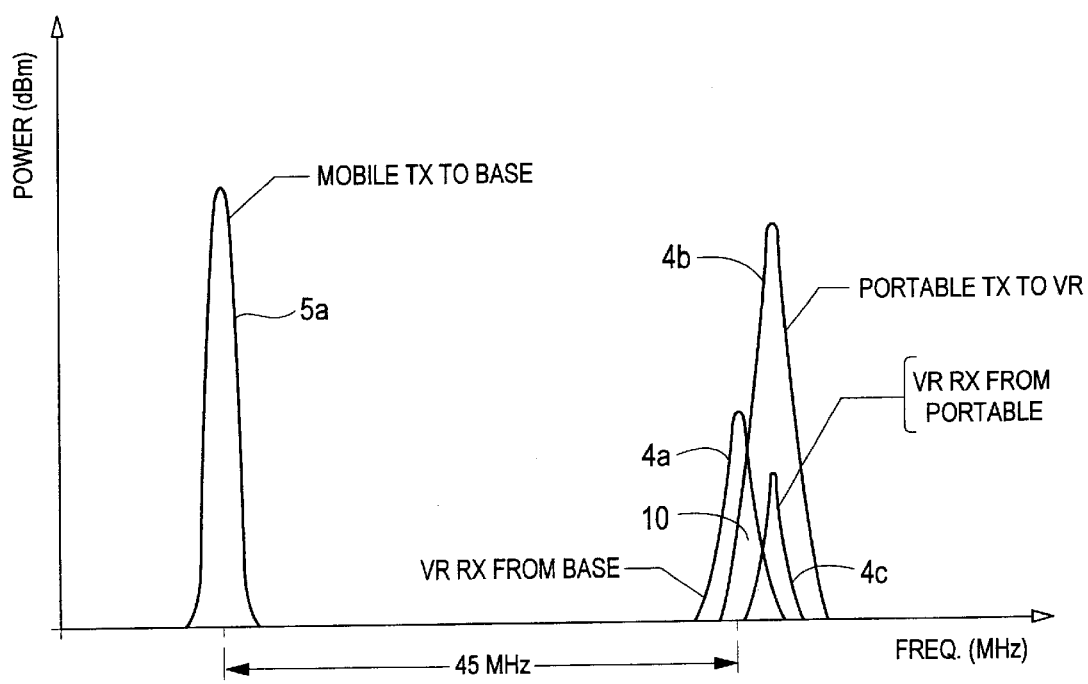
FIG. 2 is a graphical representation of a spectral measurement of the frequency channel of interest positioned at the mobile vehicular repeater unit for the prior art system illustrated in FIG. 1.

With specific reference to FIG. 1 of the drawings, there is shown an illustrative diagram of a mobile vehicular repeater unit 2 used as a vehicular repeater according to convention in which the mobile vehicular repeater unit 2 receives a signal over a forward channel portion 4a from a base station 1. The mobile vehicular repeater unit 2 further transmits a relayed signal over a repeated forward channel portion 4b to a portable unit 3. Return communication from the portable unit 3 to the mobile vehicular repeater unit occurs over a return channel portion 4c. The return channel portion 4c is transmitted at the same frequency as the forward channel portion 4b at a time different from the forward channel portion 4b transmission from mobile vehicular repeater unit 2 to the portable unit 3. The mobile 2 and the portable 3 communicate in simplex mode. The mobile vehicular repeater unit 2 receives the signal and transmits a relayed signal over a repeated reverse channel 5a for reception by the base station 1. By convention, the channel portions 4a, 4b and 4c operate at one frequency band and the reverse channel portion 5a operates within a different frequency band. The channel portion 4a is spaced apart from the reverse channel portion 5a a fixed amount along the spectral frequency range, i.e. 45 MHz in the present system. The problem with the conventional approach is that a base communication antenna 6 receiving the initial forward channel portion 4a signal is co-located with a portable communication antenna 7 transmitting the repeated forward channel 4b signal. At the location of the mobile vehicular repeater unit's base communication antenna 6, the received power of the repeated forward channel signal 4b (shown as reference numeral 10) significantly exceeds that of received power of the initial forward channel 4a signal received from the base station 1. The base communication antenna 6 on the mobile vehicular repeater unit 2 is desirably high gain with a wide dynamic range so that it is able to receive both low and high powered signals from the base station 1. When it is advantageous and appropriate to use the mobile unit 2 as a vehicular repeater, it is also the case that the portable unit 3 has insufficient sensitivity to properly resolve a signal from the base station 1. Therefore, the reception power of the initial forward channel 4a signal is quite low. The transmission antenna 7, however, transmits a relatively high powered signal (approximately 3 Watts) for proper reception by the portable unit 3. The base communication antenna 6 has difficulty properly resolving the low powered forward channel portion 4a from the "noise" 10 as a result of the relatively higher powered repeated forward channel portion 4b. With specific reference to FIG. 2 of the drawings, the base communication antenna 6 is unable to resolve two in-band signals (for example 4a and 4b) with significantly different power levels (for example −90 dBm and +5 dBm). It is also noted that the base communication antenna 6 is able to properly resolve two in-band signals with power levels in a similar order of magnitude (for example −90 dBm). FIG. 2 of the drawings illustrates the difficulty with resolving a small in band signal in the presence of a higher power in band signal. As one of ordinary skill in the art can appreciate, the repeated forward channel portion 4b appears as high powered in-band noise to the base communication antenna 6 which interferes with proper reception of the initial forward channel portion 4a signal.

Figure 3:
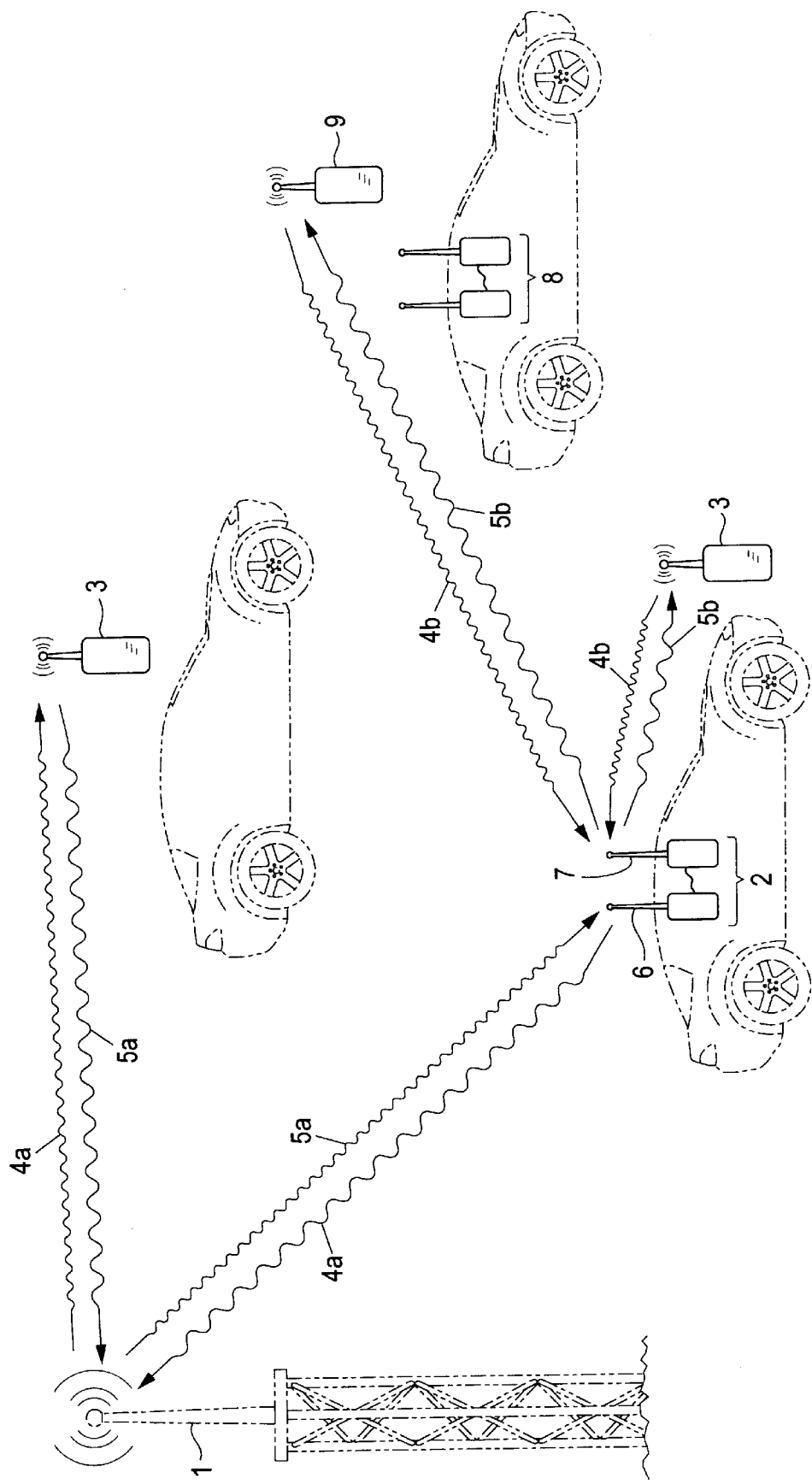
FIG. 3 is an illustrative diagram of a mobile vehicular repeater unit vehicular repeater and associated frequency plan according to the teachings of the present invention.
Figure 4:
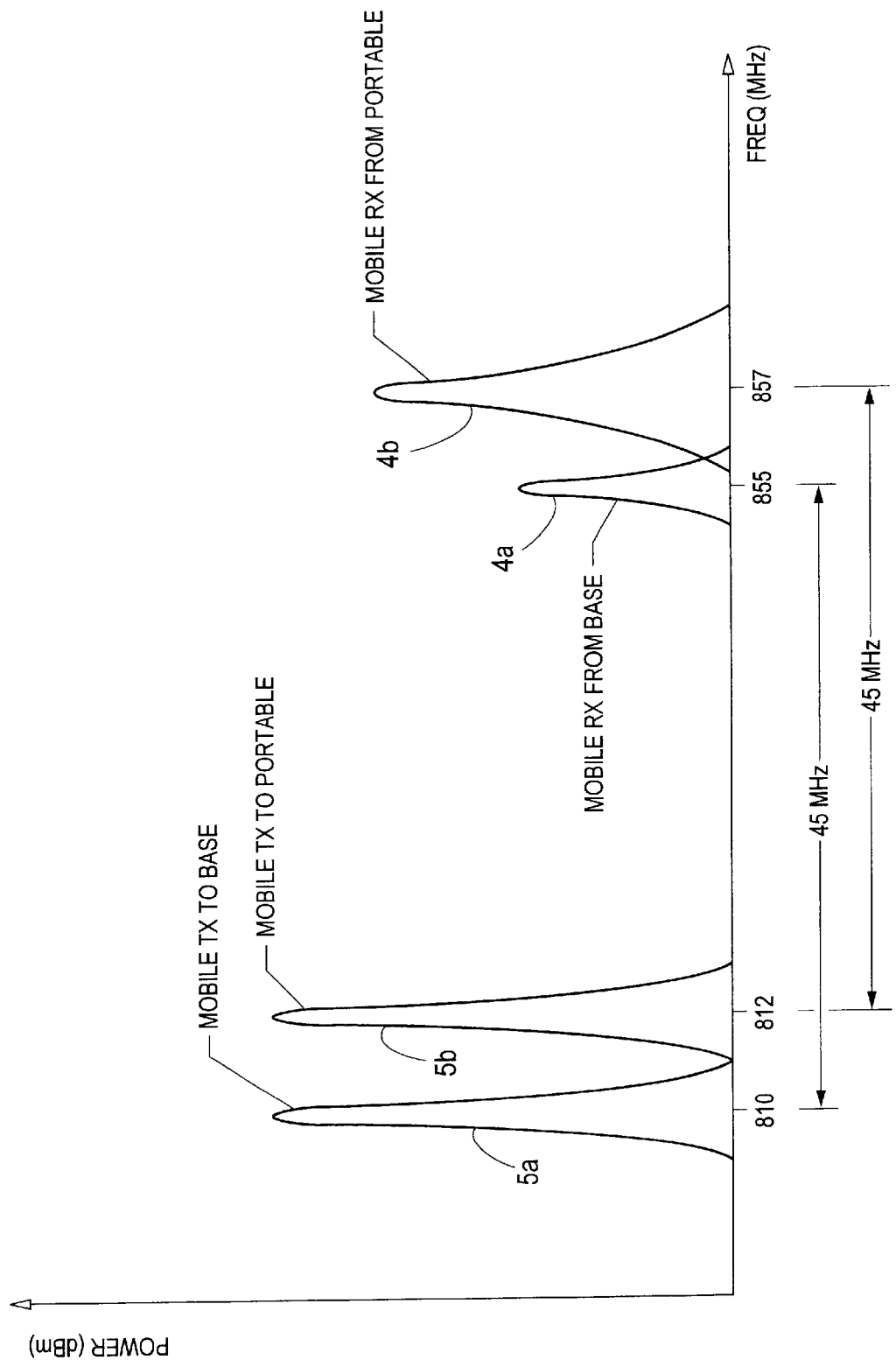
FIG. 4 is a graphical representation of a spectral measurement of the frequency channel of interest positioned at the mobile vehicular repeater unit for a system according to the diagram of FIG. 4.

According to the teachings of the present invention, a wireless communication system is proposed wherein the frequency plan of the mobile unit 2, when used as a vehicular repeater, does not follow convention. Specifically, it is proposed that when the mobile vehicular repeater unit 2 is used as a vehicular repeater, it transmit to the portable unit 3 using the lower frequency band 5 and receive from the portable unit 3 using the upper frequency band 4. As an example, a base station 1 transmits a signal over an initial forward channel portion 4a in the upper frequency band 4 having a center frequency of, for example, 855 MHz. The base station 1 receives a signal over a reverse channel portion 5a in the lower frequency band 5 having a center frequency of, for example, 810 MHz. With specific reference to FIGS. 3 & 4 of the drawings, there is shown an illustrative diagram showing the mobile vehicular repeater unit 2 used as a vehicular repeater and illustrating the change in frequency convention. The mobile vehicular repeater unit 2 is interposed between the base station 1 and the portable unit 3 to relay incoming signals between the two units.

Advantageously, according to the present invention, both the reception and transmission antennas 6,7 receive in band signals having relatively similar low power levels. The base communication antenna 6 or 7, therefore, is able to properly resolve both signals. The two in-band signals 4a and 4b can be resolved through inexpensive digital filtering and encoding plans. This change in frequency convention improves the stated problem because the high transmission power of the repeated forward channel signal 5b is separated in frequency from the low receive power initial forward channel portion signal 4a. As one of ordinary skill in the art will appreciate, the change in frequency plan convention also permits duplex communication between the mobile 2 and the portable 3. With specific reference to FIG. 4 of the drawings, there is shown a graph of received power at the mobile unit 2 as a function of frequency illustrating the relative ease of resolving the two signals even though the relative power levels are different. Additionally, when a mobile vehicular repeater unit 2 is not interposed between the portable unit 3 and the base station 1, the frequency plan operates according to convention.

There are three different possible scenarios that dictate the appropriate behavior of the portable and mobile vehicular repeater units 2,3. For purposes of nomenclature, reference is made to a primary portable unit 3 and primary mobile vehicular repeater unit 2. For practical purposes, the primary portable unit 3 and primary mobile vehicular repeater unit 2 belong to the same user where the primary mobile vehicular repeater unit 2 is installed in the user's vehicle and the primary portable unit 3 is carried by the same user. An alternative mobile vehicular repeater unit 8 and alternative portable unit 9 are used to represent other mobile vehicular repeater units and portable units that are part of the same wireless communications system as the primary mobile and portable units 2,3. In a first scenario, the base station 1 will adequately illuminate the area in which the primary portable unit 3 is located. Accordingly, the primary portable unit 3 establishes and maintains communication with the base station 1 and there is no need for the primary mobile vehicular repeater unit 2 to perform vehicular repeater functions. In a second scenario, the primary portable unit 3 is located in an area shadowed from the base station 1, but already illuminated by the alternative mobile vehicular repeater unit 8. Accordingly, the primary portable unit 3 establishes and maintains communication with the base station 1 as relayed to it by the alternative mobile vehicular repeater unit 8. In a third scenario, the primary portable unit 3 is in a area shadowed by the base station 1 and not illuminated by the alternative mobile vehicular repeater unit 8. Accordingly, the primary portable unit 3 directs the primary mobile vehicular repeater unit 2 to initiate functions as a vehicular repeater and thereafter establishes and maintains communication with the base station 1 through the primary mobile vehicular repeater unit 2 acting as the vehicular repeater.

Figure 5:
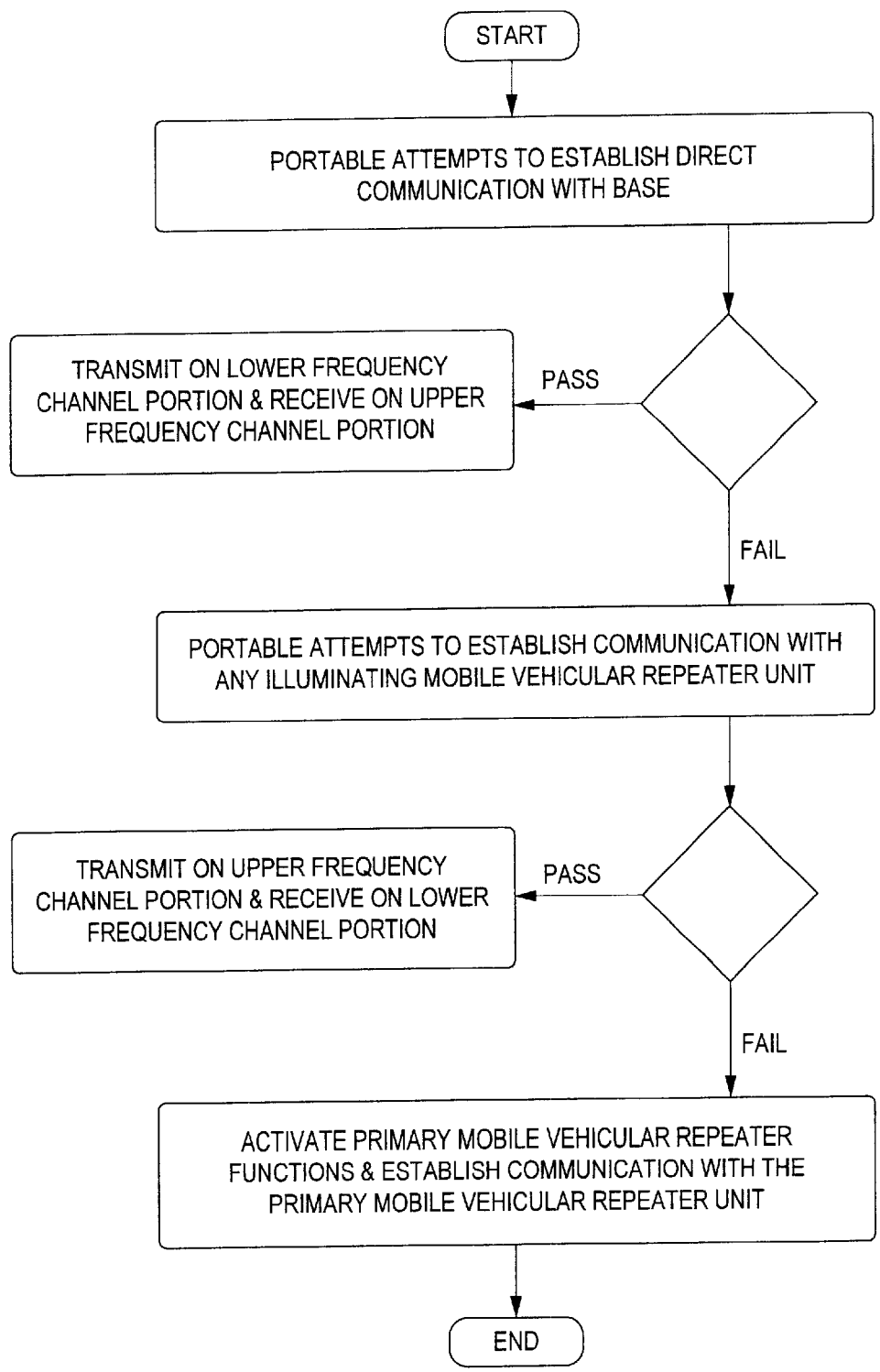
FIG. 5 is a flow chart of a process for deploying portable units and vehicular repeater mobile vehicular repeater units according to the teachings of the present invention.

With specific reference to FIG. 5 of the drawings, there is shown a flow chart representing a process by which the primary mobile vehicular repeater unit 2 and the primary portable unit 3 assess the communication scenario and establish the preferred means of communication. When the primary portable unit 3 is ready to send information into the communications system, the primary portable unit 3 attempts to establish communication directly with the base station 1. The portable unit 3 searches for an available channel on which to communicate. When the channel is found, the portable unit 3 synchronizes itself to receive on the forward channel portion 4a frequency and transmits over the reverse channel portion 5a. If communication is established, the primary mobile vehicular repeater unit 2 is not brought up as an intermediary and the primary portable unit 3 maintains communication with the base station 1.

If the attempt to establish communications directly with the base station 1 fails, the portable unit 3 modifies its frequency plan and prepares to receive data over an available channel portion in the lower frequency band 5 at, for example, 812 MHz. The portable unit 3 then attempts to establish communications with any one of a possible plurality of alternative mobile vehicular repeater units 8 that are operating as vehicular repeaters. If the primary portable unit 3 senses that the area is illuminated by the alternative mobile vehicular repeater unit 8, the primary portable unit 3 establishes and maintains communication with the base station 1 using the alternative mobile vehicular repeater unit 8 as an intermediary.

If the attempt to establish communications with any one alternative mobile vehicular repeater unit 8 fails, the primary portable unit 3 directs the primary mobile vehicular repeater unit 2 to begin functioning as a vehicular repeater. Accordingly, the mobile unit 2 is constantly listening for commands from the portable unit 3. If the primary portable unit 3 properly identifies itself as belonging to the primary mobile unit 2 to which it is communicating, the portable unit 3 is able to command the mobile unit 2 to begin operating as a mobile vehicular repeater unit 2. When commanded to do so, the mobile unit 2 executes an application to begin repeater operations. When the primary mobile vehicular repeater unit 2 is established as a vehicular repeater, the primary portable unit 3 maintains communication with the base station 1 through the primary mobile vehicular repeater unit 2. As every portable unit 2 follows the procedure outlined above, once the primary mobile vehicular repeater unit 2 is brought into the communications system as a vehicular repeater, any number of the alternative portable units 9 may use it to establish and maintain communications with the base station 1.

When the primary mobile vehicular repeater unit and at least one alternative mobile repeater vehicular unit are operating within communication range of each other, the primary mobile vehicular repeater unit may command at least one alternative vehicular repeater unit to cease repeater functions.

What is claimed is:

1. A communication system comprising:
   a base station, a mobile vehicular repeater unit, and a portable unit,
   said base station transmitting to said mobile vehicular repeater unit over an upper frequency channel portion, and said mobile vehicular repeater unit transmitting to said base station over a lower frequency channel portion and said mobile vehicular repeater unit transmitting to said portable unit over the lower frequency channel portion and said portable unit transmitting to said mobile vehicular repeater unit over the upper frequency channel portion,
   wherein the following four transmissions occur at different frequencies:
   transmission from said mobile vehicular repeater unit to said base station;
   transmission from said mobile vehicular repeater unit to said portable unit;
   transmission from said base station to said mobile vehicular repeater unit; and
   transmission from said portable unit to said mobile vehicular repeater; and, wherein:

the difference between a frequency at which said mobile vehicular repeater unit transmits to said base station and a frequency at which said mobile vehicular repeater unit transmits to said portable unit is about 2 MHz;

the difference between a frequency at which said base station transmits to said mobile vehicular repeater unit and a frequency at which said portable unit transmits to said mobile vehicular repeater unit is about 2 MHz;

the difference between a frequency at which said mobile vehicular repeater unit transmits to said base station and a frequency at which said base station transmits to said mobile vehicular repeater unit is about 45 MHz; and the difference between a frequency at which said mobile vehicular repeater unit transmits to said portable unit and a frequency at which said portable unit transmits to said mobile vehicular repeater unit is about 45 MHz.

2. A communication system as recited in claim 1 wherein said portable unit is a primary portable unit, the system further comprising at least one alternative portable unit, said mobile vehicular repeater also transmitting to said alternative portable unit over the lower frequency channel and said alternative portable unit transmitting to said mobile vehicular repeater unit over the upper frequency channel.

3. A communication system as recited in claim 1 wherein said portable unit communicates to said mobile vehicular repeater unit to initiate operations in said mobile vehicular repeater unit for it to act as a vehicular repeater.

4. The communication system of claim 1 wherein said mobile vehicular repeater unit transmits to said portable unit at a higher power than it receives from said base station.

5. The communication system of claim 1 wherein said mobile vehicular repeater unit transmits to said base station at a different frequency than it transmits to said portable unit.

6. The communication system if claim 1 wherein said base station transmits to said mobile vehicular repeater unit at a different frequency than said portable unit transmits to said mobile vehicular unit.

7. The communication system of claim 1 wherein said upper frequency channel portion is separated from said lower frequency channel portion by at least about 45 MHz.

8. The communication system of claim 1 wherein:

said mobile vehicular repeater unit transmits to said base station at about 810 MHz;

said mobile vehicular repeater unit transmits to said portable unit at about 812 MHz;

said base station transmits to said mobile vehicular repeater unit at about 855 MHz; and said portable unit transmits to said mobile vehicular repeater unit at about 857 MHz.

9. A method for communicating in a communication system, the communication system comprising at least one base station, a primary mobile vehicular repeater unit, a primary portable unit and at least one alternative mobile vehicular repeater unit, the method comprising the steps of:

the portable unit following a frequency use plan of transmitting on a lower frequency channel portion and receiving on an upper frequency channel portion, attempting to establish communication between the primary portable unit and any one of the at least one base stations, and if the attempt to establish communication between the primary portable unit and any one of the at least one base stations fails, modifying the frequency use plan for the primary portable unit by transmitting on an upper frequency channel portion and receiving on a lower frequency channel portion, attempting to establish communication between the primary portable unit and any one of the at least one alternative mobile vehicular repeater units, and if the attempt to establish communication between the primary portable unit and any one of the at least one alternative mobile vehicular repeater units fails, establishing communication between the primary portable unit and the primary mobile vehicular repeater unit and between the primary mobile vehicular repeater unit and any one of the base stations.

10. A method as recited in claim 9 and further comprising the step of said portable unit communicating to said primary mobile vehicular repeater unit to initiate functions as a vehicular repeater.

11. A method as recited in claim 9 wherein said primary mobile vehicular repeater unit and said at least one alternative mobile vehicular repeater unit are operating within communication range of each other and said primary mobile vehicular repeater unit commands said at least one alternative vehicular repeater units to cease repeater functions.

12. The method of communicating in a communication system of claim 9 wherein said primary mobile vehicular repeater unit transmits to said primary portable unit at a higher power than it receives from said base station.

13. The method of communicating in a communication system of claim 9 wherein said primary mobile-vehicular repeater unit transmits to said base station at a different frequency than it transmits to said primary portable unit.

14. The method of communicating in a communication system of claim 9 wherein said base station transmits to said primary mobile vehicular repeater unit at a different frequency than said primary portable unit transmits to said primary mobile vehicular unit.

15. The method of communicating in a communication system of claim 9 wherein said upper frequency channel portion is separated from said lower frequency channel portion by at least about 45 MHz.

16. The method of communicating in a communication system of claim 9 wherein the following four transmissions occur at different frequencies:

transmission from said primary mobile vehicular repeater unit to said base station;

transmission from said primary mobile vehicular repeater unit to said primary portable unit;

transmission from said base station to said primary mobile vehicular repeater unit; and transmission from said primary portable unit said to said primary mobile vehicular unit.

17. The method of communicating in a communication system of claim 16 wherein:

said primary mobile vehicular repeater unit transmits to said base station at about 810 MHz;

said primary mobile vehicular repeater unit transmits to said primary portable unit at about 812 MHz;

said base station transmits to said primary mobile vehicular repeater unit at about 855 MHz; and said primary portable unit transmits to said mobile vehicular unit at about 857 MHz.

18. The communication system of claim 16 wherein:

the difference between a frequency at which said primary mobile vehicular repeater unit transmits to said base station and a frequency at which said primary mobile vehicular repeater unit transmits to said primary portable unit is about 2 MHz;

the difference between a frequency at which said base station transmits to said primary mobile vehicular repeater unit and a frequency at which said primary portable unit transmits to said primary mobile vehicular unit is about 2 MHz;

the difference between a frequency at which said primary mobile vehicular repeater unit transmits to said base station and a frequency at which said base station transmits to said primary mobile vehicular repeater unit is about 45 MHz; and the difference between a frequency at which said primary mobile vehicular repeater unit transmits to said primary portable unit and a frequency at which said primary portable unit transmits to said primary mobile vehicular repeater unit is about 45 MHz.

* * * * *